(12) United States Patent
Gong et al.

(10) Patent No.: US 12,264,077 B1
(45) Date of Patent: Apr. 1, 2025

(54) PROPANE DEHYDROGENATION AND AMMONIA SYNTHESIS COUPLING SYSTEM AND PROCESS

(71) Applicant: TIANJIN UNIVERSITY, Tianjin (CN)

(72) Inventors: Jinlong Gong, Tianjin (CN); Jian Qin, Tianjin (CN); Chunlei Pei, Tianjin (CN); Zhenpu Lu, Tianjin (CN); Guodong Sun, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/837,752

(22) PCT Filed: Jun. 15, 2022

(86) PCT No.: PCT/CN2022/098813
§ 371 (c)(1),
(2) Date: Aug. 12, 2024

(87) PCT Pub. No.: WO2023/155343
PCT Pub. Date: Aug. 24, 2023

(30) Foreign Application Priority Data

Feb. 16, 2022 (CN) .......................... 202210143377.7

(51) Int. Cl.
*C01C 1/04* (2006.01)
*C01B 3/24* (2006.01)

(52) U.S. Cl.
CPC .............. *C01C 1/0417* (2013.01); *C01B 3/24* (2013.01); *C01B 2203/0272* (2013.01);
(Continued)

(58) Field of Classification Search
CPC . C01C 1/0417; C01B 3/24; C01B 2203/0272; C01B 2203/042;
(Continued)

(56) References Cited

U.S. PATENT DOCUMENTS

| 2014/0018594 | A1 | 1/2014 | Palo et al. |
| 2018/0162790 | A1* | 6/2018 | Fouad ..................... C07C 5/327 |
| 2019/0352240 | A1* | 11/2019 | Jo ........................... B01D 53/04 |

FOREIGN PATENT DOCUMENTS

| CN | 103664455 A | 3/2014 |
| CN | 107253895 A | 10/2017 |

(Continued)

OTHER PUBLICATIONS

International Search Report of PCT/CN2022/098813.
(Continued)

*Primary Examiner* — Anthony J Zimmer
*Assistant Examiner* — Syed T Iqbal

(57) ABSTRACT

A propane dehydrogenation and ammonia synthesis coupling system and process. By means of coupling a propane dehydrogenation reaction byproduct, i.e., hydrogen, and high-purity hydrogen required in an ammonia synthesis reaction as a raw material, liquid ammonia can be co-produced as well as a high-quality propylene product being produced. A hydrogen-containing tail gas, which is separated from the propane dehydrogenation reaction, only needs to undergo a simple pressure swing adsorption process to obtain high-purity hydrogen, such that the operation process becomes simple, and the energy utilization efficiency is improved.

6 Claims, 1 Drawing Sheet

(52) U.S. Cl.
 CPC .. *C01B 2203/042* (2013.01); *C01B 2203/068* (2013.01); *C01B 2203/1247* (2013.01); *C01B 2203/147* (2013.01)

(58) Field of Classification Search
 CPC ...... C01B 2203/068; C01B 2203/1247; C01B 2203/147
 See application file for complete search history.

(56) References Cited

FOREIGN PATENT DOCUMENTS

| | | | |
|---|---|---|---|
| CN | 108745337 | A | 11/2018 |
| CN | 111215045 | A | 6/2020 |
| CN | 111848327 | A | 10/2020 |
| CN | 111875466 | A | 11/2020 |
| CN | 114534653 | A | 5/2022 |
| WO | 2021237483 | A1 | 12/2021 |

OTHER PUBLICATIONS

Written Opinion of PCT/CN2022/098813.
Zhang Qi et al. "Simulation and analysis of separation process in propane dehydrogenation to propylene", Apr. 15, 2015.

* cited by examiner

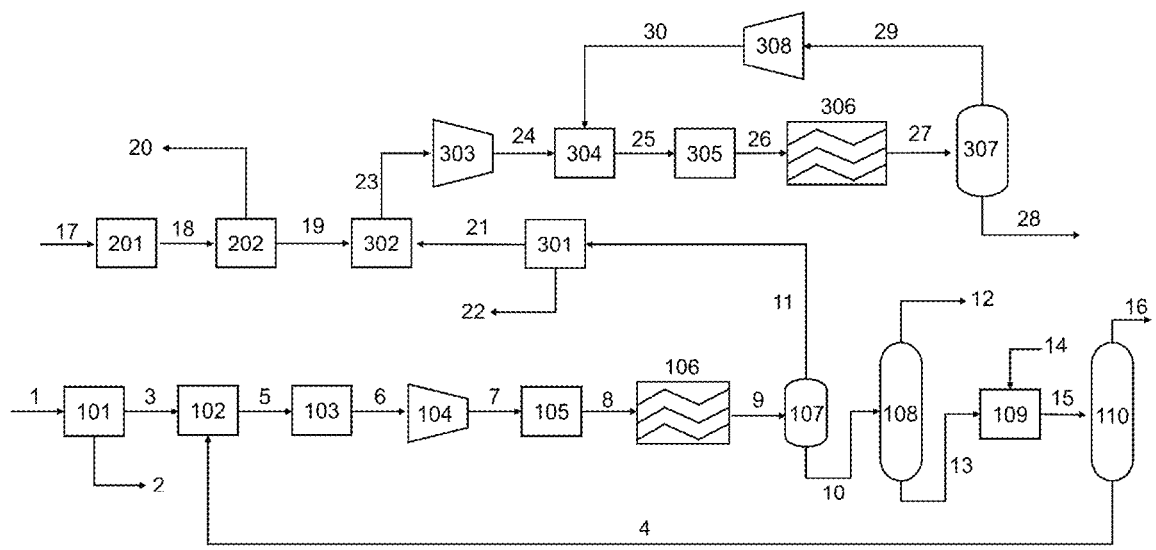

US 12,264,077 B1

PROPANE DEHYDROGENATION AND AMMONIA SYNTHESIS COUPLING SYSTEM AND PROCESS

CROSS-REFERENCE TO RELATED APPLICATIONS

This application is a national stage application of PCT/CN2022/098813. This application claims priorities from PCT Application No. PCT/CN2022/098813, filed Jun. 15, 2022, and from the Chinese patent application 2022101433777 filed Feb. 16, 2022, the content of which are incorporated herein in the entirety by reference.

TECHNICAL FIELD

The present disclosure belongs to the technical field of the petrochemical industry, and particularly relates to a propane dehydrogenation and ammonia synthesis coupling system and process.

BACKGROUND ART

Ammonia, serving as a key intermediate in the chemical industry, is widely used downstream for the production of nitrogen fertilizers and in the pharmaceutical industry. To date, global ammonia yield has reached 171 million tons per year, with an estimated 3-5% increase each year in the future, while nearly 85% of ammonia yield is used for grain production, supporting approx. 50% of the total population around the world. Established ammonia synthesis patented technologies worldwide currently include a process from U.S. Kellogg Co., a process from Danish Topsoe Co., a process from Switzerland Casale Co., a synthetic process from the Braun Co., an ICIAMV ammonia synthesis process from the Uhde Co., an LCA ammonia synthesis process from the ICI Co., a KAAP ammonia synthesis process from the KBR Co., a methanol-ammonia co-production process for ammonia synthesis, and a GC type low-pressure ammonia synthesis process from the Guochang Co. The current industrial ammonia synthesis reaction requires a large quantity of high-purity hydrogen, which is often produced from fossil fuels at the upstream segment.

In the prior art, CN 101870479B has disclosed a Fischer-Tropsch synthesis cogeneration process for synthesizing ammonia, carbon monoxide conversion and carbon dioxide removal are carried out on tail gas generated in the production process of Fischer-Tropsch wax and clean fuel oil to separate hydrogen from the tail gas, and the separated hydrogen is then used for the ammonia synthesis process at the downstream segment. A Chinese patent CN 104560201B has disclosed a production process and system of high-purity hydrogen, wherein the high-purity hydrogen is generated through the following steps: generating water gas by using bituminous coal, generating shifted gas by using the water gas, desulfurizing the shifted gas, and carrying out decarbonization and purification on the shifted gas, and the purified hydrogen is then used for the ammonia synthesis process at the downstream segment. The above patents all require specific tedious processes to yield large-scale high-purity hydrogen, and the hydrogen yielding process undoubtedly has problems of high equipment investment costs, large occupied area and the like.

SUMMARY

The present disclosure discloses a propane dehydrogenation and ammonia synthesis coupling system and process. By coupling byproduct hydrogen from a propane dehydrogenation reaction with high-purity hydrogen required for an ammonia synthesis reaction as a raw material, objectives of reducing equipment investments and energy consumption of a unit, and reducing land for construction are fulfilled. The coupling system and process are beneficial to long-cycle stable production.

To solve the above technical problems, the present disclosure is achieved by the following technical solutions:

According to one aspect of the present disclosure, a propane dehydrogenation and ammonia synthesis coupling system is provided, and includes a de-C4 rectification tower (101), a propane preheating unit (102), a propane dehydrogenation reaction unit (103), a dehydrogenation reaction gas compression unit (104), a dehydrogenation reaction gas drying unit (105), a dehydrogenation reaction gas cooling tank unit (106), a dehydrogenation reactant separation unit (107), a de-C2 rectification tower (108), a propyne hydrogenation reaction unit (109), a propane-propylene rectification tower (110), an air compressor (201), a cryogenic air separation unit (202), a pressure swing adsorption unit (301), a nitrogen and hydrogen mixer unit (302), a first nitrogen and hydrogen mixed gas compression unit (303), a nitrogen and hydrogen mixed gas preheating unit (304), an ammonia synthesis reaction unit (305), an ammonia synthesis reaction gas condensation unit (306), an ammonia synthesis reactant separation unit (307) and a second nitrogen and hydrogen mixed gas compression unit (308);

An inlet of the de-C4 rectification tower (101) is used for introducing a propane raw material (1), an overhead gaseous phase outlet of the de-C4 rectification tower (101) is connected with a gaseous phase inlet of the propane preheating unit (102), and a tower kettle liquid phase outlet of the de-C4 rectification tower (101) is used for separating C4-containing heavy component liquid (2); an outlet of the propane preheating unit (102) is connected with an inlet of the propane dehydrogenation reaction unit (103), an outlet of the propane dehydrogenation reaction unit (103) is connected with an inlet of the dehydrogenation reaction gas compression unit (104), an outlet of the dehydrogenation reaction gas compression unit (104) is connected with an inlet of the dehydrogenation reaction gas drying unit (105), an outlet of the dehydrogenation reaction gas drying unit (105) is connected with an inlet of the dehydrogenation reaction gas cooling tank unit (106), an outlet of the dehydrogenation reaction gas cooling tank unit (106) is connected with an inlet of the dehydrogenation reactant separation unit (107), a gaseous phase outlet of the dehydrogenation reactant separation unit (107) is connected with an inlet of the pressure swing adsorption unit (301), a liquid phase outlet of the dehydrogenation reactant separation unit (107) is connected with an inlet of the de-C2 rectification tower (108), an overhead gaseous phase outlet of the de-C2 rectification tower (108) is used for yielding C2-containing light component gas (12), a tower kettle liquid phase outlet of the de-C2 rectification tower (108) is connected with a liquid phase inlet of the propyne hydrogenation reaction unit (109), a gaseous phase inlet of the propyne hydrogenation reaction unit (109) is used for introducing hydrogen (14), an outlet of the propyne hydrogenation reaction unit (109) is connected with an inlet of the propane-propylene rectification tower (110), an overhead gaseous phase outlet of the propane-propylene rectification tower (110) is used for yielding a propylene product (16), and a tower kettle liquid phase outlet of the propane-propylene rectification tower (110) is connected with a liquid phase inlet of the propane preheating unit (102);

An inlet of the air compressor (201) is used for introducing air (17), an outlet of the air compressor (201) is connected with an inlet of the cryogenic air separation unit (202), a liquid phase outlet of the cryogenic air separation unit (202) is used for yielding oxygen (20), and a gaseous phase outlet of the cryogenic air separation unit (202) is connected with a first gaseous phase inlet of the nitrogen and hydrogen mixer unit (302); a methane and hydrogen mixed gas outlet of the pressure swing adsorption unit (301) is used for yielding methane and hydrogen mixed gas (22), and a pure hydrogen outlet of the pressure swing adsorption unit (301) is connected with a second gaseous phase inlet of the nitrogen and hydrogen mixer unit (302); and An outlet of the nitrogen and hydrogen mixer unit (302) is connected with an inlet of the first nitrogen and hydrogen mixed gas compression unit (303), an outlet of the first nitrogen and hydrogen mixed gas compression unit (303) is connected with a first gaseous phase inlet of the nitrogen and hydrogen mixed gas preheating unit (304), an outlet of the nitrogen and hydrogen mixed gas preheating unit (304) is connected with an inlet of the ammonia synthesis reaction unit (305), an outlet of the ammonia synthesis reaction unit (305) is connected with an inlet of the ammonia synthesis reaction gas condensation unit (306), an outlet of the ammonia synthesis reaction gas condensation unit (306) is connected with an inlet of the ammonia synthesis reactant separation unit (307), a gaseous phase outlet of the ammonia synthesis reactant separation unit (307) is connected with an inlet of the second nitrogen and hydrogen mixed gas compression unit (308), an outlet of the second nitrogen and hydrogen mixed gas compression unit (308) is connected with a second gaseous phase inlet of the nitrogen and hydrogen mixed gas preheating unit (304), and a liquid phase outlet of the ammonia synthesis reactant separation unit (307) is used for yielding a liquid ammonia product (28).

According to the other aspect of the present disclosure, a propane dehydrogenation and ammonia synthesis coupling process is provided, which includes the following reaction processes:

A propane raw material (1) enters a de-C4 rectification tower (101) to separate C4-containing heavy component liquid, where a tower kettle of the de-C4 rectification tower (101) yields liquid containing heavy components such as C4, while a tower overhead yields C3-containing light component gas (3);

The C3-containing light component gas (3) and recycled propane (4) from a tower kettle of a propane-propylene rectification tower (110) enter a propane preheating unit (102) and are heated to yield gaseous phase propane (5);

The gaseous phase propane (5) enters a propane dehydrogenation reaction unit (103) to undergo a propane dehydrogenation reaction, yielded propane dehydrogenation reaction gas (6) enters a dehydrogenation reaction gas compression unit (104) to be compressed, yielded dehydrogenation reaction compressed gas enters a dehydrogenation reaction gas drying unit (105) for dehydration, yielded dehydrogenation reaction dried gas (8) enters a dehydrogenation reaction gas cooling tank unit (106) to be cooled and condensed, a yielded condensation product (9) enters a dehydrogenation reactant separation unit (107) to be subjected to flash separation, where a tower overhead of the dehydrogenation reactant separation unit (107) yields hydrogen-containing tail gas (11), and a tower bottom yields C2/C3-containing liquid (10) and the hydrogen-containing tail gas (11);

The C2/C3-containing liquid (10) enters a de-C2 rectification tower (108) for rectification and separation, where a tower overhead of the de-C2 rectification tower (108) yields C2-containing light component gas (12), while a tower kettle yields first C3-containing liquid (13); and the first C3-containing liquid (13) and first hydrogen (14) are sent to a propyne hydrogenation reaction unit (109) for a propyne hydrogenation reaction, and second C3 liquid (15) yielded from the propyne hydrogenation reaction is sent to a propane-propylene rectification tower (110) for rectification and separation, where a tower overhead of the propane-propylene rectification tower (110) yields a propylene product (16), while a tower kettle yields recycled propane (4);

Air (17) is compressed through an air compressor (201), and yielded compressed air (18) is sent to a cryogenic air separation unit (202) for rectification and separation to yield nitrogen (19) and oxygen (20);

The hydrogen-containing tail gas (11) yielded from the tower overhead of the dehydrogenation reactant separation unit (107) is sent to a pressure swing adsorption unit (301) for separation to yield second hydrogen (21) and methane and hydrogen mixed gas (22);

The nitrogen (19) and the second hydrogen (21) enter a nitrogen and hydrogen mixer unit (302) to be uniformly mixed, yielded mixed gas (23) of nitrogen and hydrogen is compressed through a first nitrogen and hydrogen mixed gas compression unit (303), yielded mixed compressed gas (24) of nitrogen and hydrogen and pressurized recycled mixed gas (30) of nitrogen and hydrogen yielded from a second nitrogen and hydrogen mixed gas compression unit (308) enter a nitrogen and hydrogen mixed gas preheating unit (304) to be heated, yielded high-temperature mixed compressed gas (25) enters an ammonia synthesis reaction unit (305) for an ammonia synthesis reaction, yielded ammonia synthesis reaction gas (26) enters an ammonia synthesis reaction gas condensation unit (306) to be cooled and condensed, a yielded low-temperature ammonia synthesis reactant (27) enters an ammonia synthesis reactant separation unit (307) for flash separation to yield a liquid ammonia product (28) and recycled mixed gas (29) of nitrogen and hydrogen; and the recycled mixed gas (29) of nitrogen and hydrogen enters a second nitrogen and hydrogen mixed gas compression unit (308) to be compressed to yield pressurized recycled mixed gas (30) of nitrogen and hydrogen.

Further, a reaction pressure of a dehydrogenation reactor in the propane dehydrogenation reaction unit (103) ranges from 0.1 MPaA to 1.0 MPaA, and a reaction temperature ranges from 550° C. to 650° C.

Further, an operating pressure of the dehydrogenation reaction gas cooling tank unit (106) ranges from 1.0 MPaA to 1.5 MPaA, and an operating temperature ranges from −110° C. to −60° C.

Further, a reaction pressure of an ammonia synthesis reactor in the ammonia synthesis reaction unit (305) ranges from 15.0 MPaA to 20.0 MPaA, and a reaction temperature ranges from 350° C. to 500° C.

Further, an operating pressure of the ammonia synthesis reactant separation unit (307) ranges from 2.0 MPaA to 18.0 MPaA, and an operating temperature ranges from 20° C. to 50° C.

The present disclosure has the following beneficial effects:

According to the propane dehydrogenation and ammonia synthesis coupling system and process, the liquid ammonia can be co-produced while producing the high-quality propylene product, and the hydrogen-containing tail gas separated from the dehydrogenation reaction gas cooling tank unit may be processed through a simple pressure swing adsorption process to acquire the high-purity hydrogen. Compared with a traditional ammonia synthesis process, the coupling process can avoid tedious production processes such as hydrogen production from fossil fuels, making the operation process become simpler. Moreover, only the pressure swing adsorption unit and the cryogenic air separation unit need to be provided, the use of hydrogen production equipment based on fossil fuels is avoided, the use of the fossil fuels is also reduced, the energy utilization efficiency is improved, equipment investments and operation costs are reduced, land for construction is reduced, and the economic benefit of the unit is better.

BRIEF DESCRIPTION OF THE DRAWINGS

FIG. 1 is a schematic structural diagram illustrating a propane dehydrogenation and ammonia synthesis coupling system according to the present disclosure.

In the above drawings: 1: propane raw material, 2: C4-containing heavy component liquid, 3: C3-containing light component gas, 4: recycled propane, 5: gaseous phase propane, 6: propane dehydrogenation reaction gas, 7: dehydrogenation reaction compressed gas, 8: dehydrogenation reaction dried gas, 9: condensation product, 10: condensed C2/C3-containing liquid, 11: hydrogen-containing tail gas, 12: C2-containing light component gas, 13: first C3-containing liquid, 14: first hydrogen, 15: second C3-containing liquid, 16: propylene product, 17: air, 18: compressed air, 19: nitrogen, 20: oxygen product, 21: second hydrogen, 22: methane and hydrogen mixed gas (e.g. mixed gas containing methane and hydrogen), 23: mixed gas of nitrogen and hydrogen, 24: nitrogen and hydrogen mixed compressed gas, 25: high-temperature mixed compressed gas, 26: ammonia synthesis reaction gas, 27: low-temperature ammonia synthesis reactant, 28: liquid ammonia product, 29: recycled mixed gas of nitrogen and hydrogen, 30: pressurizing recycled mixed gas of nitrogen and hydrogen; 101: de-C4 rectification tower, 102: propane preheating unit, 103: propane dehydrogenation reaction unit, 104: dehydrogenation reaction gas compression unit, 105: dehydrogenation reaction gas drying unit, 106: dehydrogenation reaction gas cooling tank unit, 107: dehydrogenation reactant separation unit, 108: de-C2 rectification tower, 109: propyne hydrogenation reaction unit, 110: propane-propylene rectification tower, 201: air compressor, 202: cryogenic air separation unit, 301: pressure swing adsorption unit, 302: nitrogen and hydrogen mixer unit, 303: first nitrogen and hydrogen mixed gas compression unit, 304: nitrogen and hydrogen mixed gas preheating unit, 305: ammonia synthesis reaction unit, 306: ammonia synthesis reaction gas condensation unit, 307: ammonia synthesis reactant separation unit, and 308: second nitrogen and hydrogen mixed gas compression unit.

DETAILED DESCRIPTION OF THE EMBODIMENTS

In order to further understand the contents, features and effects of the present disclosure, the following embodiments are listed and described in detail below with reference to the drawings.

As shown in FIG. 1, a propane dehydrogenation and ammonia synthesis coupling system is provided in the embodiment, and includes a de-C4 rectification tower 101, a propane preheating unit 102, a propane dehydrogenation reaction unit 103, a dehydrogenation reaction gas compression unit 104, a dehydrogenation reaction gas drying unit 105, a dehydrogenation reaction gas cooling tank unit 106, a dehydrogenation reactant separation unit 107, a de-C2 rectification tower 108, a propyne hydrogenation reaction unit 109, a propane-propylene rectification tower 110, an air compressor 201, a cryogenic air separation unit 202, a pressure swing adsorption unit 301, a nitrogen and hydrogen mixer unit 302, a first nitrogen and hydrogen mixed gas compression unit 303, a nitrogen hydrogen mixed gas preheating unit 304, an ammonia synthesis reaction unit 305, an ammonia synthesis reaction gas condensation unit 306, an ammonia synthesis reactant separation unit 307 and a second nitrogen and hydrogen mixed gas compression unit 308.

An inlet of the de-C4 rectification tower 101 is used for introducing a propane raw material 1, an overhead gaseous phase outlet of the de-C4 rectification tower 101 is connected with a gaseous phase inlet of the propane preheating unit 102, and a tower kettle liquid phase outlet of the de-C4 rectification tower 101 is used for yielding liquid 2 containing heavy components such as C4. An outlet of the propane preheating unit 102 is connected with an inlet of the propane dehydrogenation reaction unit 103, an outlet of the propane dehydrogenation reaction unit 103 is connected with an inlet of the dehydrogenation reaction gas compression unit 104, an outlet of the dehydrogenation reaction gas compression unit 104 is connected with an inlet of the dehydrogenation reaction gas drying unit 105, an outlet of the dehydrogenation reaction gas drying unit 105 is connected with an inlet of the dehydrogenation reaction gas cooling tank unit 106, an outlet of the dehydrogenation reaction gas cooling tank unit 106 is connected with an inlet of the dehydrogenation reactant separation unit 107, a gaseous phase outlet of the dehydrogenation reactant separation unit 107 is connected with an inlet of the pressure swing adsorption unit 301, a liquid phase outlet of the dehydrogenation reactant separation unit 107 is connected with an inlet of the de-C2 rectification tower 108, an overhead gaseous phase outlet of the de-C2 rectification tower 108 is used for yielding C2-containing light component gas (12), a tower kettle liquid phase outlet of the de-C2 rectification tower 108 is connected with a liquid phase inlet of the propyne hydrogenation reaction unit 109, a gaseous phase inlet of the propyne hydrogenation reaction unit 109 is used for introducing hydrogen 14, an outlet of the propyne hydrogenation reaction unit 109 is connected with an inlet of the propane-propylene rectification tower 110, an overhead gaseous phase outlet of the propane and propylene rectification tower 110 is used for yielding a propylene product 16, and a tower kettle liquid phase outlet of the propane and propylene rectification tower 110 is connected with a liquid phase inlet of the propane preheating unit 102.

An inlet of the air compressor 201 is used for introducing air 17, an outlet of the air compressor 201 is connected with an inlet of the cryogenic air separation unit 202, a liquid phase outlet of the cryogenic air separation unit 202 is used for yielding oxygen 20, and a gaseous phase outlet of the cryogenic air separation unit 202 is connected with a first gaseous phase inlet of the nitrogen and hydrogen mixer unit 302.

A methane and hydrogen mixed gas outlet of the pressure swing adsorption unit 301 is used for yielding methane and hydrogen mixed gas 22, and a pure hydrogen outlet of the pressure swing adsorption unit 301 is connected with a second gaseous phase inlet of the nitrogen and hydrogen mixer unit 302.

An outlet of the nitrogen and hydrogen mixer unit 302 is connected with an inlet of the first nitrogen and hydrogen mixed gas compression unit 303, an outlet of the first nitrogen and hydrogen mixed gas compression unit 303 is connected with a first gaseous phase inlet of the nitrogen and hydrogen mixed gas preheating unit 304, an outlet of the nitrogen and hydrogen mixed gas preheating unit 304 is connected with an inlet of the ammonia synthesis reaction unit 305, an outlet of the ammonia synthesis reaction unit 305 is connected with an inlet of the ammonia synthesis reaction gas condensation unit 306, an outlet of the ammonia synthesis reaction gas condensation unit 306 is connected with an inlet of the ammonia synthesis reactant separation unit 307, a gaseous phase outlet of the ammonia synthesis reactant separation unit 307 is connected with an inlet of the second nitrogen and hydrogen mixed gas compression unit 308, an outlet of the second nitrogen and hydrogen mixed gas compression unit 308 is connected with a second gaseous phase inlet of the nitrogen and hydrogen mixed gas preheating unit 304, and a liquid phase outlet of the ammonia synthesis reactant separation unit 307 is used for yielding a liquid ammonia product 28.

A process based on the propane dehydrogenation and ammonia synthesis coupling system includes the following reaction processes:

A propane raw material 1 enters a de-C4 rectification tower 101 to separate C4-containing heavy component liquid, wherein the propane raw material includes ethane, propane and butane. A tower kettle of the de-C4 rectification tower 101 yields liquid 2 containing heavy components such as C4, while a tower overhead of the de-C4 rectification tower 101 yields C3-containing light component gas 3.

The C3-containing light component gas 3 and recycled propane 4 from a tower kettle of a propane-propylene rectification tower 110 enter a propane preheating unit 102 and are heated to yield gaseous phase propane 5.

The gaseous phase propane 5 enters a propane dehydrogenation reaction unit 103 to carry out a propane dehydrogenation reaction, and propane dehydrogenation reaction gas 6 is yielded, wherein operating conditions of a dehydrogenation reactor in the propane dehydrogenation reaction unit 103 are that a reaction pressure ranges from 0.1 MPaA to 1.0 MPaA, and a reaction temperature ranges from 550° C. to 650° C.; and the reaction pressure and the reaction temperature may ensure the better conversion rate of propane dehydrogenation and the better selectivity of propylene, thus ensuring the better yield of byproduct hydrogen.

The propane dehydrogenation reaction gas 6 enters a dehydrogenation reaction gas compression unit 104 to be compressed, and dehydrogenation reaction compressed gas 7 is yielded.

The dehydrogenation reaction compressed gas 7 enters a dehydrogenation reaction gas drying unit 105 for dehydration, and dehydrogenation reaction dried gas 8 is yielded.

The dehydrogenation reaction dried gas 8 is sent to a dehydrogenation reaction gas cooling tank unit 106 to be cooled and condensed, and a condensation product 9 is yielded. An operating pressure of the dehydrogenation reaction gas cooling tank unit 106 ranges from 1.0 MPaA to 1.5 MPaA, an operating temperature ranges from −110° C. to −60° C., and the concentration and energy consumption of hydrogen-containing tail gas are both appropriate due to the operating pressure and the operating temperature.

The condensation product 9 enters a dehydrogenation reactant separation unit 107 to be subjected to flash separation, where a tower overhead of the dehydrogenation reactant separation unit 107 yields the hydrogen-containing tail gas 11, while a tower bottom yields C2/C3-containing liquid 10 and the hydrogen-containing tail gas 11.

The C2/C3-containing liquid 10 enters a de-C2 rectification tower 108 for rectification and separation, where a tower overhead of the de-C2 rectification tower 108 yields C2-containing light component gas 12, while a tower kettle yields first C3-containing liquid 13.

The first C3-containing liquid 13 and first hydrogen 14 are sent to a propyne hydrogenation reaction unit 109 for a propyne hydrogenation reaction, and second C3-containing liquid 15 is yielded.

The second C3-containing liquid 15 is sent to a propane and propylene rectification tower 110 for rectification and separation, where a tower overhead of the propane and propylene rectification tower 110 yields a propylene product 16, which is sent out of a boundary area of the system; and a tower kettle of the propylene rectification tower 110 yields the recycled propane 4, which is recycled to the propane preheating unit 102.

Air 17 is sent to an air compressor 201 to be compressed through the air compressor 201, and compressed air 18 is yielded. The compressed air 18 is sent to a cryogenic air separation unit 202 for rectification and separation to yield nitrogen 19 and oxygen 20, the nitrogen 19 is sent to an ammonia synthesis reaction unit, and the oxygen product 20 is sent out of the boundary area.

The hydrogen-containing tail gas 11 yielded from the tower overhead of the dehydrogenation reactant separation unit 107 is sent to a pressure swing adsorption unit 301 for separation, and second hydrogen 21 and methane and hydrogen mixed gas 22 are yielded at an outlet of the pressure swing adsorption unit 301.

The nitrogen 19 and the second hydrogen 21 are sent to a nitrogen and hydrogen mixer unit 302 to be mixed evenly, and mixed gas 23 of nitrogen and hydrogen is yielded.

The mixed gas 23 of nitrogen and hydrogen is compressed through a first nitrogen and hydrogen mixed gas compression unit 303, and mixed compressed gas 24 of nitrogen and hydrogen is yielded.

The mixed compressed gas 24 of nitrogen and hydrogen, together with pressurized recycled mixed gas 30 of nitrogen and hydrogen yielded from a second nitrogen and hydrogen mixed gas compression unit 308, enters a nitrogen and hydrogen mixed gas preheating unit 304 to be heated, and high-temperature mixed gas compressed gas 25 is yielded.

The high-temperature mixed gas compressed gas 25 enters the ammonia synthesis reaction unit 305 for an ammonia synthesis reaction, and ammonia synthesis reaction gas 26 is yielded. Operating conditions of an ammonia synthesis reactor in the ammonia synthesis reaction unit 305 are that a reaction pressure ranges from 15.0 MPaA to 20.0

MPaA and a reaction temperature ranges from 350° C. to 500° C.; and the reaction pressure and the reaction temperature may ensure the better conversion rate of the ammonia synthesis reaction, and ensure reasonable energy consumption while improving the ammonia yield.

The ammonia synthesis reaction gas 26 enters an ammonia synthesis reaction gas condensation unit 306 to be cooled and condensed, and a low-temperature ammonia synthesis reactant 27 is yielded.

The low-temperature ammonia synthesis reactant 27 enters an ammonia synthesis reactant separation unit 307 for flash separation, and a liquid ammonia product 28 and recycled mixed gas 29 of nitrogen and hydrogen are yielded; the recycled mixed gas 29 of nitrogen and hydrogen enters a second nitrogen and hydrogen mixed gas compression unit 308 to be compressed, and the pressurized recycled mixed gas 30 of nitrogen and hydrogen is yielded; and the pressurized recycled mixed gas 30 of nitrogen and hydrogen is recycled to the nitrogen and hydrogen mixed gas preheating unit 304, and the liquid ammonia product 28 is sent out of the boundary area. Wherein an operating pressure of the ammonia synthesis reactant separation unit 307 ranges from 2.0 MPaA to 18.0 MPaA, and an operating temperature ranges from 20° C. to 50° C.; and the operating pressure and the reaction temperature may ensure that the liquid ammonia is separated from the mixed gas of nitrogen and hydrogen as far as possible, and that the yield of the high-purity liquid ammonia is improved.

It is evident that according to the propane dehydrogenation and ammonia synthesis coupling system and process, by coupling reaction gas from propane dehydrogenation and reaction gas from ammonia synthesis, the tedious process of hydrogen production from fossil fuels commonly used in the industry is avoided, the objectives of improving the energy utilization efficiency, reducing equipment investments and the energy consumption of a unit, and reducing land for construction are fulfilled, long-cycle stable production is facilitated, and the economic benefit of the reaction system is improved.

Although the preferred embodiments of the present disclosure are described above with reference to the drawings, the present disclosure is not limited to the above specific implementations, and the above specific implementations are only schematic instead of restrictive. Those ordinarily skilled in the art may also make many forms of specific transformations without departing from the purpose of the present disclosure and the scope protected by the claims under the inspiration of the present disclosure, and these transformations all belong to the protection scope of the present disclosure.

What is claimed is:

1. A propane dehydrogenation and ammonia synthesis coupling system, including a de-C4 rectification tower (101), a propane preheating unit (102), a propane dehydrogenation reaction unit (103), a dehydrogenation reaction gas compression unit (104), a dehydrogenation reaction gas drying unit (105), a dehydrogenation reaction gas cooling tank unit (106), a dehydrogenation reactant separation unit (107), a de-C2 rectification tower (108), a propyne hydrogenation reaction unit (109), a propane-propylene rectification tower (110), an air compressor (201), a cryogenic air separation unit (202), a pressure swing adsorption unit (301), a nitrogen and hydrogen mixer unit (302), a first nitrogen and hydrogen mixed gas compression unit (303), a nitrogen and hydrogen mixed gas preheating unit (304), an ammonia synthesis reaction unit (305), an ammonia synthesis reaction gas condensation unit (306), an ammonia synthesis reactant separation unit (307) and a second nitrogen and hydrogen mixed gas compression unit (308);

an inlet of the de-C4 rectification tower (101) is used for introducing a propane raw material (1), an overhead gaseous phase outlet of the de-C4 rectification tower (101) is connected with a gaseous phase inlet of the propane preheating unit (102), and a tower kettle liquid phase outlet of the de-C4 rectification tower (101) is used for separating C4-containing heavy component liquid (2); an outlet of the propane preheating unit (102) is connected with an inlet of the propane dehydrogenation reaction unit (103), an outlet of the propane dehydrogenation reaction unit (103) is connected with an inlet of the dehydrogenation reaction gas compression unit (104), an outlet of the dehydrogenation reaction gas compression unit (104) is connected with an inlet of the dehydrogenation reaction gas drying unit (105), an outlet of the dehydrogenation reaction gas drying unit (105) is connected with an inlet of the dehydrogenation reaction gas cooling tank unit (106), an outlet of the dehydrogenation reaction gas cooling tank unit (106) is connected with an inlet of the dehydrogenation reactant separation unit (107), a gaseous phase outlet of the dehydrogenation reactant separation unit (107) is connected with an inlet of the pressure swing adsorption unit (301), a liquid phase outlet of the dehydrogenation reactant separation unit (107) is connected with an inlet of the de-C2 rectification tower (108), an overhead gaseous phase outlet of the de-C2 rectification tower (108) is used for yielding C2-containing light component gas (12), a tower kettle liquid phase outlet of the de-C2 rectification tower (108) is connected with a liquid phase inlet of the propyne hydrogenation reaction unit (109), a gaseous phase inlet of the propyne hydrogenation reaction unit (109) is used for introducing hydrogen (14), an outlet of the propyne hydrogenation reaction unit (109) is connected with an inlet of the propane-propylene rectification tower (110), an overhead gaseous phase outlet of the propane-propylene rectification tower (110) is used for yielding a propylene product (16), and a tower kettle liquid phase outlet of the propane-propylene rectification tower (110) is connected with a liquid phase inlet of the propane preheating unit (102);

an inlet of the air compressor (201) is used for introducing air (17), an outlet of the air compressor (201) is connected with an inlet of the cryogenic air separation unit (202), a liquid phase outlet of the cryogenic air separation unit (202) is used for yielding oxygen (20), and a gaseous phase outlet of the cryogenic air separation unit (202) is connected with a first gaseous phase inlet of the nitrogen and hydrogen mixer unit (302); a methane and hydrogen mixed gas outlet of the pressure swing adsorption unit (301) is used for yielding methane and hydrogen mixed gas (22), and a pure hydrogen outlet of the pressure swing adsorption unit (301) is connected with a second gaseous phase inlet of the nitrogen and hydrogen mixer unit (302); and an outlet of the nitrogen and hydrogen mixer unit (302) is connected with an inlet of the first nitrogen and hydrogen mixed gas compression unit (303), an outlet of the first nitrogen and hydrogen mixed gas compression unit (303) is connected with a first gaseous phase inlet of the nitrogen and hydrogen mixed gas preheating unit (304), an outlet of the nitrogen and hydrogen mixed gas preheating unit (304) is connected with an inlet of the ammonia synthesis reaction unit (305), an outlet of the ammonia synthesis reaction unit (305) is connected with an inlet of the ammonia synthesis reaction gas condensation unit (306), an outlet of the ammonia synthesis reaction gas condensation unit (306) is connected with an inlet of the ammonia synthesis reactant separation unit (307), a gaseous phase outlet of the ammonia synthesis reactant separation unit (307) is connected with an inlet of the second nitrogen and hydrogen mixed gas compression unit (308), an outlet of the second nitrogen and hydrogen mixed gas compression unit (308) is connected with a second gaseous phase inlet of the nitrogen and hydrogen mixed gas preheating unit (304), and a liquid phase outlet of the ammonia synthesis reactant separation unit (307) is used for yielding a liquid ammonia product (28).

2. A propane dehydrogenation and ammonia synthesis coupling process, including the following reaction processes:

introducing a propane raw material (1) into a de-C4 rectification tower (101) to separate C4-containing heavy component liquid, wherein C4-containing heavy component liquid is yielded from a tower kettle of the de-C4 rectification tower (101), while C3-containing light component gas (3) is yielded from a tower overhead of the de-C4 rectification tower (101);

introducing the C3-containing light component gas (3) and recycled propane (4) from a tower kettle of a propane-propylene rectification tower (110) into a propane preheating unit (102) and being heated to yield gaseous phase propane (5);

introducing the gaseous phase propane (5) into a propane dehydrogenation reaction unit (103) to undergo a propane dehydrogenation reaction, and introducing yielded propane dehydrogenation reaction gas (6) into a dehydrogenation reaction gas compression unit (104) to be compressed, and introducing yielded dehydrogenation reaction compressed gas into a dehydrogenation reaction gas drying unit (105) for dehydration, and introducing the yielded dehydrogenation reaction dried gas (8) into a dehydrogenation reaction gas cooling tank unit (106) to be cooled and condensed, a yielded condensation product (9) entering a dehydrogenation reactant separation unit (107) to be subjected to flash separation, where hydrogen-containing tail gas (11) is yielded from a tower overhead of the dehydrogenation reactant separation unit (107), and C2/C3-containing liquid (10) and hydrogen-containing tail gas (11) is yielded from a tower bottom of the dehydrogenation reactant separation unit (107);

introducing the C2/C3-containing liquid (10) into a de-C2 rectification tower (108) for rectification and separation, where C2-containing light component gas (12) is yielded from a tower overhead of the de-C2 rectification tower (108), while first C3-containing liquid (13) is yielded from a tower kettle of the de-C2 rectification tower (108); and introducing the first C3-containing liquid (13) and first hydrogen (14) to a propyne hydrogenation reaction unit (109) for a propyne hydrogenation reaction, and introducing second C3 liquid (15) yielded from the propyne hydrogenation reaction to a propane-propylene rectification tower (110) for rectification and separation, where a propylene product (16) is yielded from a tower overhead of the propane-propylene rectification tower (110), while recycled propane (4) is yielded from a tower kettle of the propane-propylene rectification tower (110);

compressing air (17) through an air compressor (201), and introducing compressed air (18) to a cryogenic air separation unit (202) for rectification and separation to yield nitrogen (19) and oxygen (20);

introducing the hydrogen-containing tail gas (11) yielded from the tower overhead of the dehydrogenation reactant separation unit (107) to a pressure swing adsorption unit (301) for separation to yield second hydrogen (21) and methane and hydrogen mixed gas (22);

introducing the nitrogen (19) and the second hydrogen (21) to a nitrogen and hydrogen mixer unit (302) to be uniformly mixed, compressing yielded mixed gas (23) of nitrogen and hydrogen through a first nitrogen and hydrogen mixed gas compression unit (303) to obtain mixed compressed gas (24) of nitrogen and hydrogen, heating the mixed compressed gas (24) of nitrogen and hydrogen and pressurized recycled mixed gas (30) of nitrogen and hydrogen yielded from a second nitrogen and hydrogen mixed gas compression unit (308) in a nitrogen and hydrogen mixed gas preheating unit (304), introducing high-temperature mixed compressed gas (25) to an ammonia synthesis reaction unit (305) for an ammonia synthesis reaction, introducing yielded ammonia synthesis reaction gas (26) to an ammonia synthesis reaction gas condensation unit (306) to be cooled and condensed to obtain low-temperature ammonia synthesis reactant (27), introducing the low-temperature ammonia synthesis reactant (27) to an ammonia synthesis reactant separation unit (307) for flash separation to yield a liquid ammonia product (28) and recycled mixed gas (29) of nitrogen and hydrogen; and introducing the recycled mixed gas (29) of nitrogen and hydrogen to a second nitrogen and hydrogen mixed gas compression unit (308) to be compressed to yield pressurized recycled mixed gas (30) of nitrogen and hydrogen.

3. The propane dehydrogenation and ammonia synthesis coupling process according to claim 2, wherein a reaction pressure of a dehydrogenation reactor in the propane dehydrogenation reaction unit (103) ranges from 0.1 MPaA to 1.0 MPaA, and a reaction temperature ranges from 550° C. to 650° C.

4. The propane dehydrogenation and ammonia synthesis coupling process according to claim 2, wherein an operating pressure of the dehydrogenation reaction gas cooling tank unit (106) ranges from 1.0 MPaA to 1.5 MPaA, and an operating temperature ranges from −110° C. to −60° C.

5. The propane dehydrogenation and ammonia synthesis coupling process according to claim 2, wherein a reaction pressure of an ammonia synthesis reactor in the ammonia synthesis reaction unit (305) ranges from 15.0 MPaA to 20.0 MPaA, and a reaction temperature ranges from 350° C. to 500° C.

6. The propane dehydrogenation and ammonia synthesis coupling process according to claim 2, wherein an operating pressure of the ammonia synthesis reactant separation unit (307) ranges from 2.0 MPaA to 18.0 MPaA, and an operating temperature ranges from 20° C. to 50° C.

* * * * *